Patented Dec. 8, 1936

2,063,158

UNITED STATES PATENT OFFICE 2,063,158

RESINS CONTAINING NITROGEN

Crawford H. Greenewalt, Wilmington, Del., assignor to E. I. du Pont de Nemours & Company, Wilmington, Del., a corporation of Delaware No Drawing. Application March 19, 1936, Serial No. 69,723

13 Claims. (Cl. 260—2)

This invention relates to resins containing nitrogen, more particularly hydrogenated nitrogen-containing resins, and to a process for the preparation thereof.

It is an object of the invention to produce new and improved nitrogen-containing resins. Another object is the preparation of new and improved resins containing basic amino-nitrogen. A further object is the production of resins soluble in dilute aqueous acids. A still further object is the provision of a new and improved process for producing resins of the character above described. An additional object is the provision of a process for producing resins of the type described, which proceeds smoothly and can be carried out economically with readily available raw materials and equipment. Other objects will appear hereinafter.

These objects are accomplished by treating a resin having ketone groups with an excess of anhydrous ammonia or equivalent thereof, and contacting the resulting mixture with hydrogen at superatmospheric pressures and temperatures and in the presence of a hydrogenation catalyst.

The invention is illustrated, but not limited, by the following examples in which the quantities are stated in parts by weight.

Example I

The compound bis(4-hydroxycyclohexyl) dimethylmethane was heated in the liquid phase at atmospheric pressure and 185°–260° C. with copper chromite catalyst. Dehydrogenation to bis-(4-ketocyclohexyl) dimethylmethane took place, which compound, under conditions of the dehydrogenation, polymerized to a resin containing about one ketone group per dicyclohexylpropane residue. Seventy-five (75) parts of this resin were charged into a small shaking autoclave together with 75 parts of dioxane, 50 parts of liquid ammonia, and 10 parts of nickel-on-kieselguhr catalyst. The mixture was heated at 140° C. for thirty to forty minutes, hydrogen then being admitted to the autoclave until the total pressure was about 170 atmospheres. The reaction was complete in five hours. The product was removed from the autoclave and the catalyst filtered from the hot solution. The latter was poured into water, whereupon 70 parts of the amino resin separated. This resin was soluble in toluene, dioxane, alcohol, and was partially soluble in dilute aqueous mineral and organic acids, such as hydrochloric, acetic and formic acids. These solutions foam copiously on shaking. Elementary analysis of this resin gave the results: C, 77.51%; H, 10.96%; N, 5.10%.

Example II

A resin containing approximately one ketone group per three cyclohexyl nuclei was prepared as follows: phenol-formaldehyde resin was hydrogenated at about 170° C. and 100–170 atmospheres hydrogen pressure in the presence of a nickel catalyst whereby the phenolic hydroxyl groups are converted to secondary alcohol groups. The hydrogenated phenol-formaldehyde resin was then dehydrogenated at 185°–260° C. and atmospheric pressure in the presence of copper chromite catalyst, whereby the secondary alcohol groups are converted to ketone groups. Fifty (50) parts of this resin containing ketone groups were dissolved in 50 parts of toluene, and the solution placed in a shaking autoclave with 15 parts of nickel hydrogenating catalyst. Fifty (50) parts of dry ammonia were added and the sealed autoclave heated to 140° C. for about twenty minutes. Hydrogen was then introduced into the tube until the total pressure was about 190 atmospheres, and the hydrogenation reaction allowed to proceed for three and three-fourths hours at 140°–160° C. The charge was removed from the autoclave and the catalyst filtered from the hot toluene solution. The solvent was removed under diminished pressure and the residue taken up in hot alcohol. The amino resin was precipitated from the alcohol solution by pouring into cold water. This resin was partially soluble in dilute aqueous mineral and organic acids. It had a nitrogen content of 5.15%.

Example III

Forty-nine (49) parts of polymeric methyl vinyl ketone, 125 parts of dioxane, and 7 parts of a nickel hydrogenating catalyst were charged into a small autoclave. Forty-seven (47) parts of dry ammonia were added to the mixture. The temperature showed a marked rise indicating an exothermic reaction between the ammonia and ketone groups in the resin. Hydrogen was then introduced until the total pressure was within the range from about 100 to about 170 atmospheres, and the mixture heated at 180°–200° C. for twelve hours. The absorption of hydrogen ceased in about ten hours. The cooled autoclave was evacuated and the catalyst filtered from the hot dioxane solution. The amino resin was precipitated by pouring the dioxane solution into cold water. This resin was completely soluble in 2–10% aqueous acids, both mineral and organic. It was readily soluble, for example, in 5% aqueous acetic acid. Its elementary analysis was as follows: C, 78.30%; H, 8.89%; N, 6.71%.

The process of the present invention is applicable to the hydrogenation, in the presence of ammonia or its equivalents, of all polymers containing active ketone groups. Examples I and II show the hydrogenation, in the presence of ammonia, of polymers in which the ketone groups are a part of a hydroaromatic ring. Example III shows the hydrogenation, in the presence of ammonia, of methyl vinyl ketone polymers which presumably have a linear structure in which the ketone groups recur along a carbon chain. In place of the particular polymers used in the examples, there may be used, with similar results, many other resins containing ketone groups, such as (a) those prepared by the hydrogenation and dehydrogenation of any phenol-aldehyde resin; (b) those prepared from other vinyl ketones, for example, alpha-methylvinyl methyl ketone and others in which the alphahydrogen atom of the vinyl radical is replaced by a hydrocarbon radical; and (c) those obtained by the thermal polymerization of hydroaromatic ketones produced by oxidation or dehydrogenation of the hydroaromatic alcohols resulting from ring hydrogenation of such phenols as bis(4-hydroxyphenyl)cyclohexane, bis(4-hydroxyphenyl)naphthane, bis(4-hydroxynaphthyl)methane, bis(3-methyl-4-hydroxyphenyl)dimethylmethane, bis-(3,5-dimethyl-4-hydroxyphenyl)ethylmethane, etc. Ketone-containing resins of type (a) may be prepared in one way as given in Example II; other details and variations are given in the co-pending application of W. A. Lazier, U. S. Serial No. 67,305 filed March 5, 1936. Ketone-containing resins of the type (c) are made by ring-hydrogenating the original phenol at 150°–200° C. and 100–200 atmospheres hydrogen pressure, in the presence of nickel catalyst. The resulting hydroaromatic alcohols may be catalytically dehydrogenated to the corresponding ketones in the liquid phase at atmospheric pressure and 150°–300° C. in the presence of copper chromite catalyst. Alternatively, the mentioned hydroaromatic alcohols may be oxidized to ketones in any well known way, as with chromic acid. The hydroaromatic ketones are polymerized to resins containing ketone groups by heating at 150°–200° C., alone or in the presence of acid or alkali condensing agents such as sodium hydroxide, or the resins may be formed in situ in the dehydrogenation step. Ketone-containing resins of type (b) may be prepared by any one of several methods, such as by treating an aqueous solution or suspension of the monomeric vinyl ketone with 0.5% to 3.0% of benzoyl peroxide as a polymerization catalyst, and about 1.0% of an alkali metal sulfate of a long chain aliphatic monohydric alcohol or an alkali metal salt-polymeric acid of the acrylic acid series, such as polymethacrylic acid, as a dispersing agent for the polymer. In this way, the ketone polymer is obtained as a stable suspension which is a form particularly suited for hydrogenation in the presence of ammonia.

The process described herein is applicable to the hydrogenation of resins containing ketone groups in the presence of ammonia, primary amines or secondary amines, but not tertiary amines. For the purposes of this invention, the operable nitrogen compounds are referred to comprehensively as compounds containing amino-nitrogen having attached thereto at least one hydrogen atom. As examples of amines which may be employed in accordance with the invention may be mentioned aliphatic amines, e. g., methylamine, dimethylamine, ethylamine, diethylamine, propylamine, isoproplyamine, butylamine, ethanolamine, diethanolamine, tetramethylenediamine, pentamethylenediamine, ethylenediamine, n-dodecylamine, glucamine, fructamine, lactamine, and methyl-glucamine; heterocyclic amines, e. g., piperidine; alicyclic amines, e. g., cyclohexylamine; and aromatic amines, e. g., aniline, toluidine, alpha-naphthylamine, benzylamine, monoethylaniline, and para-phenylenediamine. In general, the aliphatic and alicyclic monoamines are preferred. Of the aliphatic amines it is preferable to employ those containing six carbon atoms or less.

The conditions of reaction are subject to variation. It has been noted that a reaction may occur between the amino-nitrogen compound and the polymer containing ketone groups when these materials are brought together. Hydrogen may be introduced immediately or after allowing preliminary reaction between the aforesaid reactants.

While the temperature may vary within a relatively wide range, for instance, from about 25° C. to about 250° C., it is usually preferable to effect the hydrogenation reaction at a temperature between 140° and 200° C. The pressure range during the hydrogenation is also subject to variation and the reaction may be effected at pressures from 1 to 250 atmospheres. In general, however, it is preferable to employ pressures of about 100 to 200 atmospheres.

Hydrogenation catalysts such as nickel, cobalt, palladium, and platinum may be employed. The catalyst may be in the massive form or it may be supported on kieselguhr, pumice, or the like. Other hydrogenation catalysts of a type well known to those skilled in the art may be used. Nickel catalysts have given especially desirable results. In carrying out the hydrogenation, solvents such as dioxane, toluene, cyclohexane, tetrahydronaphthalene, and decahydronaphthalene are preferably employed. The polymer may be in suspension or solution.

The time of reaction may vary within relatively wide limits, depending upon the particular polymer treated. In general, the reaction is complete when no more hydrogen is absorbed by the mixture.

The proportions of the reactants may vary. In general, it is preferable to employ 100 to 300 parts of solvent, 100 parts of ammonia or an amine, and 14 to 30 parts of nickel catalyst per 100 parts of polymer.

The resins described herein find their most valuable application as coating compositions, which may range from those consisting of a solution of the amino resin only in an aqueous acid or in an organic solvent, to those which contain very small amounts of the resin or acid salt thereof. The following are typical of the latter: (a) aqueous emulsions of materials liquid under conditions of emulsification, such as oils and waxes, the resin exerting an emulsifying effect; (b) aqueous dispersions of materials solid under the conditions of emulsification, such as pigments, in which case the resin acts as a dispersing agent; (c) aqueous compositions containing both solids and liquids, wherein the resin has both emulsifying and dispersing effects. When any one of these three types of compositions are to be used for special purposes, they may contain various appropriate auxiliary agents known to the art, such as mold or mildew inhibitors, wetting agents, antioxidants, plasticizers, insecticides, adhesives, film-forming materials, and the like.

The above compositions are valuable for all varieties of coating, this word being used in its broadest sense to imply application not only to impervious bodies such as metals the surface only of which is coated, but also to porous or fibrous bodies such as wood, porous stone, brick, plaster, paper, paper pulp, asbestos, felt, cotton, wool, regenerated cellulose, etc., and articles of manufacture therefrom, such as textiles.

Specific illustrations of the use of these coating compositions are as follows. Solutions of the amine resin in acids may be employed as sizes for rayon tire cord to improve its adhesion to rubber, and as sizes for transparent sheets of regenerated cellulose to improve the anchorage thereto of printing inks and lacquers. Coating compositions which are aqueous emulsions of a wax, such as paraffin, and a fixing agent, such as aluminum acetate, having as an emulsifying agent an amino resin salt, such as the acetate of the product of Example I, are very valuable for sizing and water-proofing textiles. Coating compositions which are aqueous dispersions of titanium oxide and/or other finely divided water-insoluble solid (which may be a mildew preventive such as salicylanilide), a wetting agent, a softener, and as a dispersing agent the product of Example III or other similar amino resin, are useful for sizing and delustering fabrics and for affixing the water-insoluble solid thereto. The coating compositions containing amino resins of the present type may also be used as adhesives. They find further use as sizes for paper, especially as beater sizes in the manufacture of chalk-filled paper. The amino resins themselves may be formed into filaments and self-supporting films.

As many apparently widely different embodiments of this invention may be made without departing from the spirit and scope thereof, it is to be understood that I do not limit myself to the specific embodiments thereof except as indicated in the appended claims.

I claim:

1. The process of producing hydrogenated nitrogen-containing resins which comprises hydrogenating a resinous body containing ketone groups in the presence of a hydrogenation catalyst and a compound containing amino-nitrogen having attached thereto at least one hydrogen atom.

2. The process of producing hydrogenated nitrogen-containing resins which comprises reacting a resinous body containing ketone groups with a compound containing amino-nitrogen having attached thereto at least one hydrogen atom, and hydrogenating in the presence of a hydrogenation catalyst.

3. The process of producing hydrogenated nitrogen-containing resins which comprises hydrogenating a resinous body containing ketone groups in the presence of a hyrogenation catalyst, a compound containing amino-nitrogen having attached thereto at least one nitrogen atom, and a solvent.

4. The process of producing hydrogenated nitrogen-containing resins which comprises hydrogenating a resinous body containing ketone groups in the presence of a nickel catalyst and a compound containing amino-nitrogen having attached thereto at least one hydrogen atom.

5. The process of producing hydrogenated nitrogen-containing resins which comprises hydrogenating a resinous body containing ketone groups in the presence of a hydrogenation catalyst and a compound containing amino-nitrogen having attached thereto at least one hydrogen atom, at temperatures from about 140° C. to about 200° C. and at pressures within the range of about 100 to 200 atmospheres.

6. The process of producing hydrogenated nitrogen-containing resins which comprises bringing together polymeric methyl vinyl ketone and dry ammonia in the presence of dioxane and a nickel catalyst in a closed vessel, introducing hydrogen until the total pressure is within the range of about 100 to about 200 atmospheres, and heating the mixture to a temperature within the range of 140° to 200° C.

7. A hydrogenated nitrogen-containing resin which is the reaction product obtainable by the hydrogenation of a resinous body containing ketone groups in the presence of a hydrogenation catalyst and a compound containing amino-nitrogen having attached thereto at least one hydrogen atom.

8. A hydrogenated nitrogen-containing resin which is the product of the hydrogenation of a vinyl ketone polymer in the presence of a hydrogenation catalyst and a compound containing amino-nitrogen having attached thereto at least one hydrogen atom.

9. A hydrogenated nitrogen-containing resin which is the reaction product obtainable by the hydrogenation of a resinous body containing ketone groups in the presence of a hydrogenation catalyst and ammonia.

10. A hydrogenated nitrogen-containing resin which is the product of the hydrogenation of a vinyl ketone polymer in the presence of a hydrogenation catalyst and ammonia.

11. A nitrogen-containing resin which is the hydrogenated reaction product of polymeric methyl vinyl ketone and ammonia, said resin being soluble in dilute aqueous acetic acid.

12. Coating composition containing the product set forth in claim 7.

13. An acid addition salt of the product set forth in claim 7.

CRAWFORD H. GREENEWALT.